Aug. 19, 1952     A. C. MILLARD ET AL     2,607,219
TORQUE MEASURING TOOL
Filed Aug. 23, 1946                             4 Sheets-Sheet 1
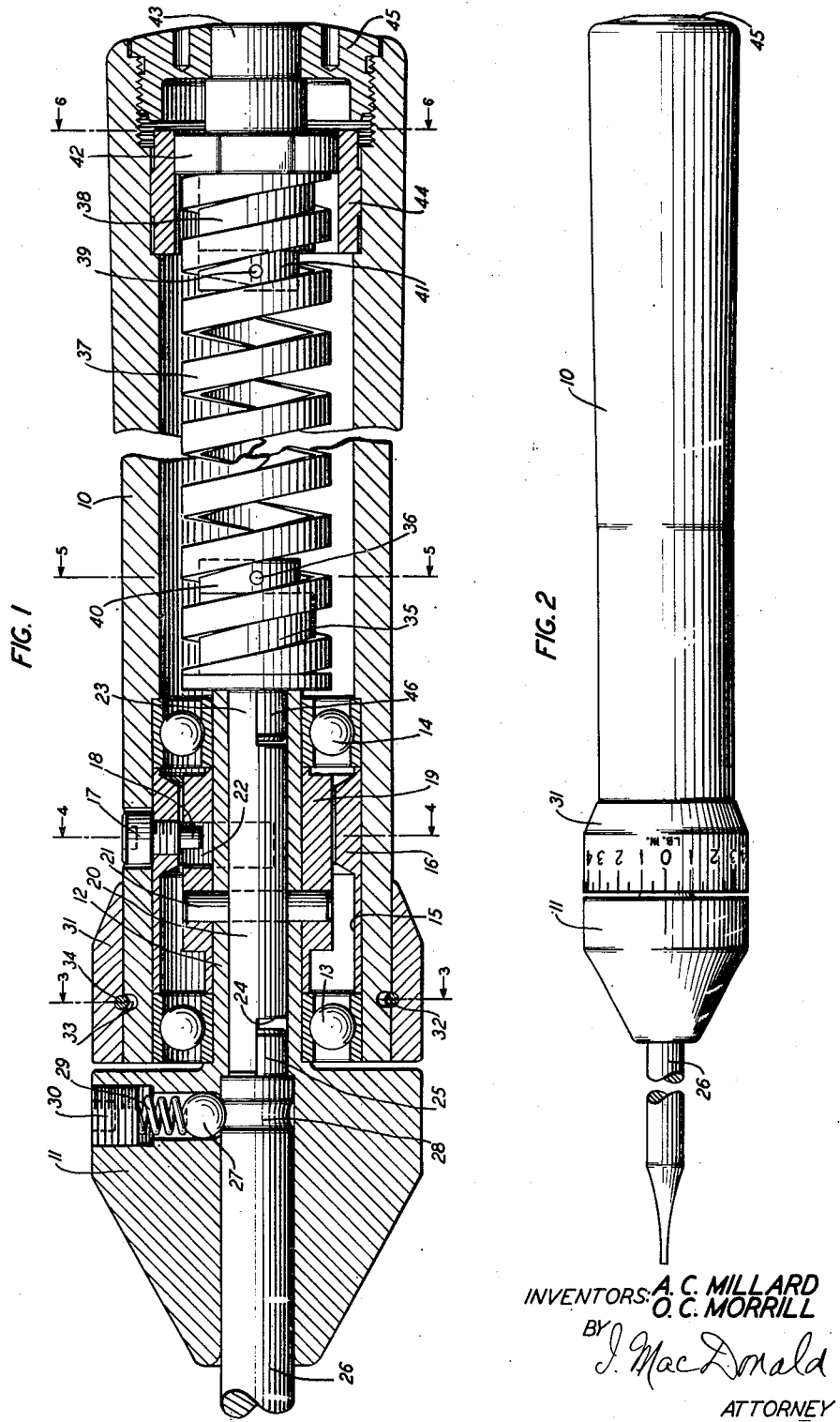
INVENTORS: A. C. MILLARD
                O. C. MORRILL
BY J. MacDonald
                             ATTORNEY Aug. 19, 1952  A. C. MILLARD ET AL  2,607,219
TORQUE MEASURING TOOL
Filed Aug. 23, 1946  4 Sheets-Sheet 2
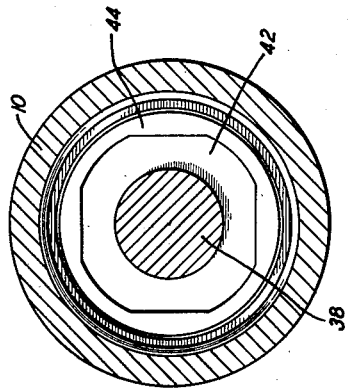
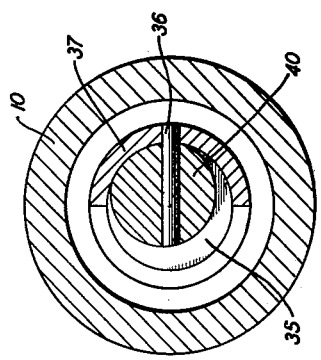
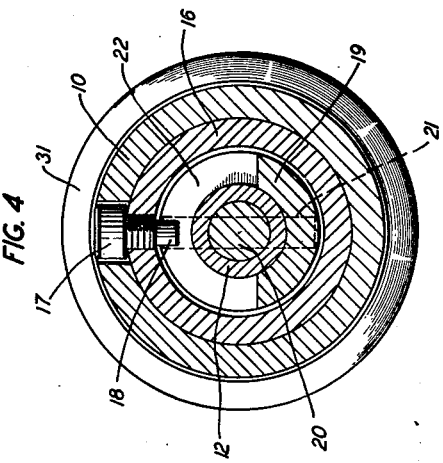
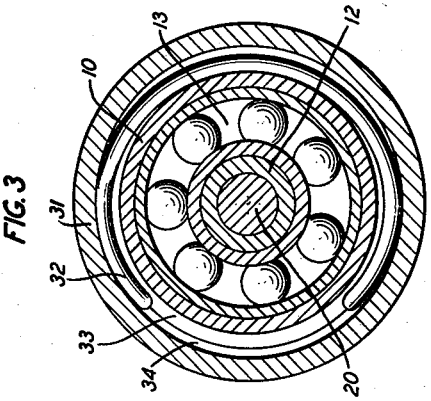
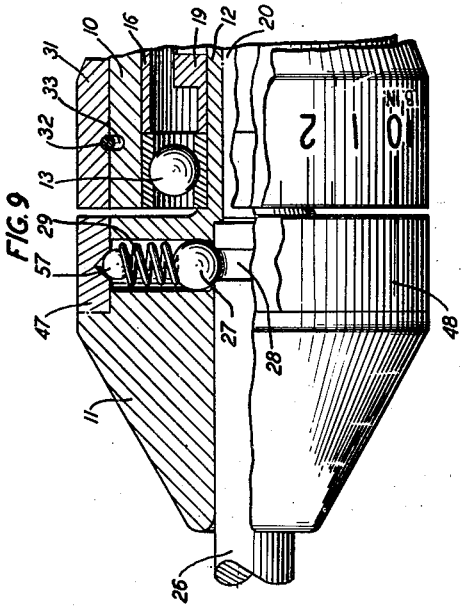
INVENTORS: A. C. MILLARD
O. C. MORRILL
BY J. MacDonald
ATTORNEY

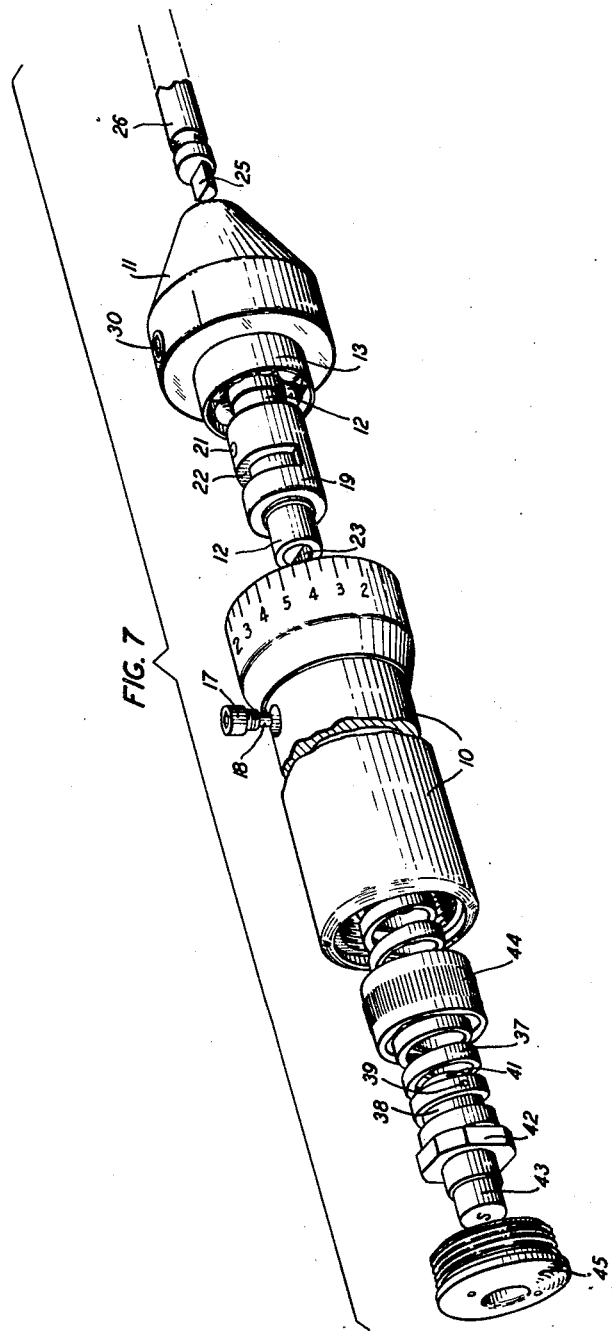
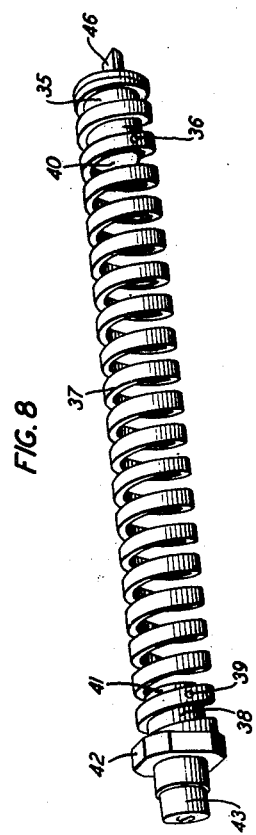

Aug. 19, 1952 A. C. MILLARD ET AL 2,607,219
TORQUE MEASURING TOOL
Filed Aug. 23, 1946 4 Sheets-Sheet 4
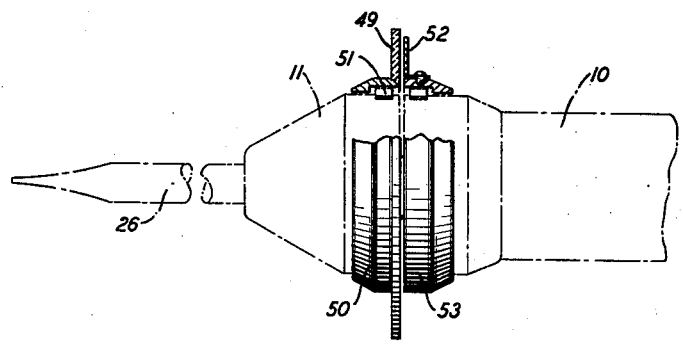
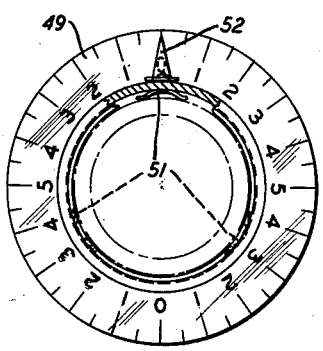
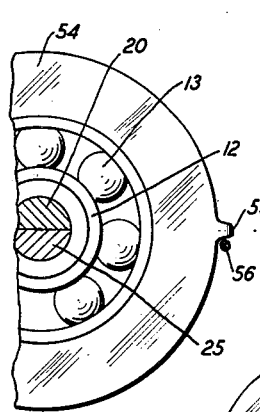
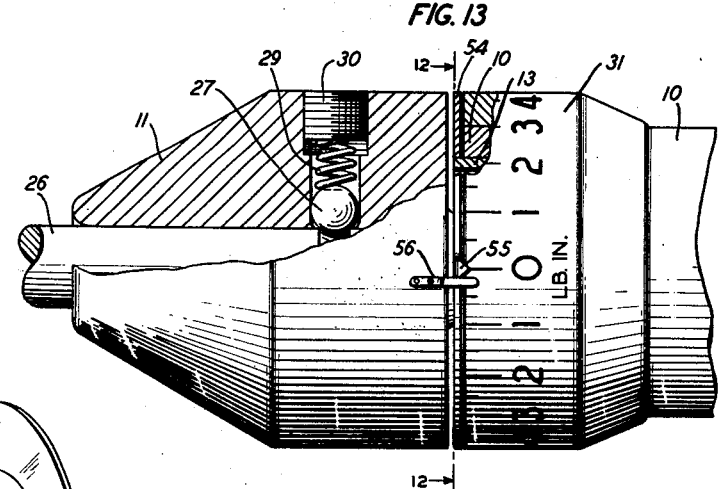
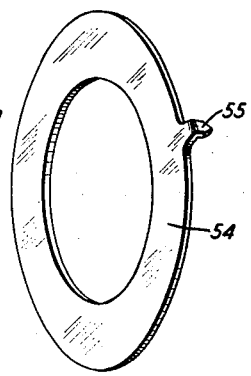
INVENTORS: A. C. MILLARD
O. C. MORRILL
BY J. MacDonald
ATTORNEY Patented Aug. 19, 1952

2,607,219

UNITED STATES PATENT OFFICE 2,607,219

TORQUE MEASURING TOOL

Arthur C. Millard, Plainfield, N. J., and Otis C. Morrill, Bronxville, N. Y.; said Millard assignor to Bell Telephone Laboratories, Incorporated, New York, N. Y., a corporation of New York, and said Morrill assignor to Otis C. Morrill and Albert H. Morrill, copartners, doing business as Morrill and Morrill, New York, N. Y., a firm Application August 23, 1946, Serial No. 692,614

3 Claims. (Cl. 73—139)

This invention relates to torque measuring devices and more particularly to a precision tool of the portable type for measuring the torque applied therethrough in either a clockwise or counter-clockwise direction, to rotatable bodies such as nuts, bolts, screws, etc., and registering the torque applied therethrough by a suitable indicating means.

The object of this invention is to provide a precision torque measuring tool which will measure rotatable bodies with a tolerance so small that for all practical purposes it is negligible.

Another object of this invention is to provide a precision torque measuring tool, which due to its novel construction, can be used to cover a wide range of torque calibrations.

A further object of the invention is the provision of a torque measuring tool which will indicate and register the amount of torque applied to the object being worked upon.

A still further object of the invention is the provision of a torque measuring tool which will measure the torque required to rotate a member in either a clockwise or counter-clockwise direction.

A still further object of the invention is the provision of a tool for measuring the torque of rotatable bodies in which the torsion element is so constructed that the effective length of the element is the same when it is actuated in either a clockwise or a counter-clockwise direction.

In those instances where the successful operation of a piece of equipment depends upon the proper degree of tightness of the component parts such as screws, nuts, bolts, shafts, and in fact any rotatable body, torque standards are usually set up for the particular object involved and some means is usually provided for checking the torque required to tighten or loosen the component parts of the equipment involved.

Devices for measuring the torque or force applied through a wrench, screwdriver or other similar tool have been provided in the past, but none of these devices are of the so-called precision type, since a few inch pounds plus or minus did not make very much difference and was not controlling. However, due to the advent of higher standards in manufacturing and the mass production of instruments and machines in which the tolerances are set within very close limits, it is imperative that a torque measuring tool be provided which will not only measure the torque or force required to tighten or loosen a rotatable body, but be extremely accurate within very close limits, both in a clockwise and counter-clockwise direction. In other words, the tool must be a precision instrument of high order and one which will maintain its high degree of accuracy for the life of the tool.

It is also essential that such a tool should provide not only a means for indicating, in torque units, the force required for measuring the torque either in a clockwise or counter-clockwise direction, but should also register such force on a suitable scale so that it may be read after the tool has returned to its normal position and has been removed from the object worked upon.

Torque measuring tools in the past have used various types of torsion elements for loading, such as flat springs, wires, coil springs, rods, bars, etc. However, it has been found that these elements could not be depended upon to maintain their accuracy over a long period of time and the range of such elements were so limited that a separate tool had to be provided for each range of measurement.

To overcome the shortcomings in existing tools of this type and to provide a high grade precision type of tool for measuring and registering the torque or force required to rotate a body in either a clockwise or counter-clockwise direction, an improved torque measuring tool has been designed.

The tool of this invention comprises a tubular handle or casing having a blade or implement receiving chuck located at one end thereof, the chuck is rotatably mounted in one end of the housing and has its inner end connected to a suitable torsion element, which in turn is secured to the opposite end of the housing on the interior thereof. The torsion element of the tool of this invention comprises a precision made helical spring constructed of a high grade spring stock and having its end portions terminating on supporting members which are constructed in such a manner that the effective spiral length along the neutral axis of the spring is the same when it is rotated either in a clockwise direction to expand the coils or in a counter-clockwise direction to contract them and will return to its exact normal position. This is due to the novel type of spring mounting means which connects the ends of the spring to the clutch and to the inner end of the handle. In order that a wide range of torque measurements may be made, springs of various degrees of strength are provided and are readily interchangeable.

A rotatable band having a circumferential scale thereon is located on the outer end of the handle, adjacent the chuck, and is adapted to indicate, by means of a hairline on the chuck, the amount of torque applied to the handle. This band is rotatable and may be set at the desired position in the initial operation of the tool.

In order to facilitate the use of this tool, there is not only provided a rotatably adjustable band, having a circumferential scale thereon, on the head of the tool, but in a modification thereof, means are associated with the rotatable chuck for registering the amount of torque applied when the chuck and the implement mounted therein has returned to its normal or zero position. Thus the tool may be removed and a reading taken on the scale. This feature is designed to operate when the tool is used either clockwise or counter-clockwise and eliminates the need for observing when the object operated thereon, releases under the influence of the torsion means.

In another modification of this tool, the scale is located on a disc-like member which projects outwardly from the handle at substantially right angles thereto thus providing a scale which may be easily read when the tool is being used in a vertical position or when the scale on the side of the tool is inaccessible.

Further objects and advantages will be readily apparent from the following description when read in connection with the accompanying drawings of which:

Fig. 1 is a longitudinal, foreshortened sectional view of the tool of this invention with parts broken away to show the interior construction thereof;

Fig. 2 is an elevational view, on a reduced scale, of the tool shown in Fig. 1;

Fig. 3 is a cross-sectional view taken on line 3—3 of Fig. 1;

Fig. 4 is a cross-sectional view taken on line 4—4 of Fig. 1;

Fig. 5 is a cross-sectional view taken on line 5—5 of Fig. 1;

Fig. 6 is a cross-sectional view taken on line 6—6 of Fig. 1;

Fig. 7 is a foreshortened, exploded view in perspective, of the tool shown in Fig. 1;

Fig. 8 is an enlarged view, in perspective, of the spring or torsion element of the tool of this invention;

Fig. 9 is a fragmentary view, with portions broken away, of a modified type of chuck in which a rotatable band, having a hairline mark thereon is provided, thus enabling the tool to be set and used so that the hairline is readily visible;

Fig. 10 is an elevational view, partly in section, of a modified type of indicating scale and pointer, applied to the chuck end of the tool.

Fig. 11 is a top plan view of the scale and pointer shown in Fig. 11.

Fig. 12 is a fragmentary cross-sectional view taken on line 12—12 of Fig. 13.

Fig. 13 is a fragmentary view partly in section, illustrating a modified type of scale and pointer which registers the torque applied when the chuck has returned to its normal position under the influence of the torsion element; and Fig. 14 is a view in perspective of the indicating pointer and ring employed in the modification shown in Fig. 13.

The device of our invention as shown in the various figures of the drawings, comprises an elongated tubular handle or housing 10 having rotatable mounted on one end thereof a chuck member 11 said chuck provided with an integral extending sleeve member 12, the central bore of which is in alignment with an enlarged central bore in the chuck 11. Located in the end of the tubular member 10, adjacent the chuck 11, are the ball-bearings 13 and 14, which serve to journal the chuck 11 by supporting the sleeve portion 12 thereof.

Situated between the bearings 13 and 14 and mounted therein and maintaining them in spaced relation, is the sleeve or bushing 15. This sleeve is provided at its inner end with a thickened wall section 16 in which a set screw 17 having an extending tip portion 18 is mounted. Mounted on the interior of the sleeve 15 and fitting over the sleeve portion 12 of the chuck 11 is a bushing 19, which is secured to the sleeve 12 and the shaft 20 by means of the pin 21. Located in the bushing 19 is a radial slot 22, which extends circumferentially around said bushing approximately 180 degrees as shown in Fig. 4.

As shown in Fig. 1, the tip 18 of the screw 17 extends into the slot 21 to limit the amount of rotation of the shaft 20 and the chuck 11 which is secured thereto by means of the pin 21 within a radius of 180 degrees, or in other words 90 degrees in either direction from normal position, thus it will be readily observed that the chuck 11 and its associated parts will be free to rotate on the bearings 13 and 14 within the limits of the set screw 17 positioned in the slot 22; this limits the amount of rotation of the chuck 11, one quarter turn from normal in either a clockwise or counter-clockwise direction.

The shaft 20 is provided at its inner and outer ends with shouldered portions 23 and 24. The outer shoulder 24 is adapted to engage the shoulder 25 of the bit 26 which is positioned in the central bore of the chuck 11 and held therein by means of the ball 27 which is held in engagement with the groove 28, in the bit 26, by means of the spring 29 and the set screw 30.

As shown in the various figures, a rotatable band 31, having a scale engraved thereon, is positioned on the outer surface of the handle 10 adjacent the chuck 11, with its graduations registering with the hairline on the chuck 11. The band 31 as shown in Figs. 1, 3 and 9 is held in position by means of the expanding ring 32 which is located in circumferential grooves 33 and 34 in the member 10 and the band 31.

The inner end of the shaft 20 has its shouldered portion 23 in engagement with a shoulder 46 on supporting member 35 to which is secured by means of the pin 36 the inner end of the spring 37, the outer end of this spring is secured to supporting member 38 in a similar manner by means of a pin 39.

The inner ends of the spring supporting members 35 and 38, as shown in detail in Fig. 8, are provided with reduced shouldered portions 40 and 41 so that the effective length of the spring 37 will be between the pins 36 and 39 and will therefore be extremely accurate and exert the same amount of torsion irrespective of the direction of rotation of the spring 37 and will return the chuck 11 to its exact normal position, or zero setting, no matter which direction the spring is rotated. Without this feature and if this novel type of mounting was not employed the spring 37 would not exert the same amount of torsion in each direction since when the spring 37 is tightened by counterclockwise rotation of the handle 10, the diameter of the coils of the spring are reduced, thus causing the inside of the coil to grip the support and to bind thereon and the effective length is only from the point of contact between the spring and its support at each end thereof. By the same token when the spring is rotated so as to unwind or loosen, the coils of the spring increase and permit the coils which are in engagement with the supports to slide around. This permits the effective length of the spring to extend to that portion of the spring where it is secured to its support. Thus it can be readily observed that from a given normal position or zero setting, when the spring is at rest, a reading on the scale would not be the same for either a clockwise or counter-clockwise direction of rotation.

With the novel type of spring mounting as employed in the tool of this invention extreme accuracy is assured and the reading on the scale will be the same within very close limits irrespective of the direction of rotation of the torsion element or spring.

As shown in Fig. 1 and in detail in Figs. 7 and 8, the spring 37 terminates at its outer end on the supporting member 38 as heretofore described. This supporting member is provided with an octagonal shoulder 42 and an extending reduced diameter portion 43. The shoulder 42 is positioned in and is embraced by the inner walls of a bushing or sleeve 44 which is fixedly secured in position in the central bore of the housing 10, at the outer end thereof, thus maintaining in fixed position and against rotation the outer end of the spring and its support 38. In order that dirt and moisture may be excluded from the interior of the tool, a cap 45 is threadedly mounted in the end of the housing 10. This cap also serves to support the reduced end 43 of the support 38.

In a modified form of chuck or operating head, we have provided as shown in Fig. 9, an adjustable zero setting. This is accomplished by providing a rotating band 47 located in a suitable recess in the chuck 11 and having a zero setting hairline 48 engraved thereon. This band is maintained in position by means of a ball 57 which is held in frictional engagement with the inner wall of the band by means of the spring 29. This modified type of scale permits a zero setting to be made irrespective of the position of the tool which in some instances may be in such a position that the fixed hairline on the chuck 11 would be obscured.

In those instances wherein the tool of this invention is to be used in a vertical or other position which would impair the reading of the scale, as shown in the figures heretofore described, we have provided, as shown in Figs. 10 and 11, a disc type of scale which extends outwardly, substantially at right angles from the handle 10 of the tool. This scale comprises a disc 49 of plastic or some other suitable material and has provided thereon a series of graduations on its upper or inside surface. The disc 49 is rigidly secured to a band 50 which in turn is frictionally mounted on the chuck 11 by means of the spring members 51. These springs will exert sufficient pressure to maintain the disc in a fixed position with respect to the chuck 11 but will readily permit it to be rotated independently of the chuck for the initial or zero setting. A pointer 52, is affixed to the band 53 which is similarly constructed and which is mounted in a like manner on the body or casing of the handle 10 of the tool.

It has been found that in some instances it is desirable to record or register the amount of force or torque exerted by the tool on a given object and to meet this situation we have provided a modified type of pointer and scale as shown in Fig. 13. In substance the operating head or chuck of the tool is the same as that shown in Fig. 1 and differs therefrom in that we have provided in place of the hairline on the chuck 11 a thin metallic ring or washer 54 having an indicating pointer 55 affixed thereto. This ring 54, as shown in Fig. 13 is positioned between the inner side of the chuck 11 and the outer side of the band 31 and is rotatably mounted on the extending lip portion of the bearing 13 with the pointer 55 extending a short distance over the scale on the ring 31. Located on the chuck member 11 is a projecting member 56 which, when the handle or casing 10 of the tool is rotated, will engage the pointer 55 and cause said pointer to maintain a fixed position with respect to said scale as said scale passes thereunder, however, upon release of the torsion element either by the slipping of the device being operated upon or by the release of the pressure applied to the handle, the chuck 11 will return to its normal or zero position but the pointer 55 will maintain its position over the scale on band 31 registering the amount of torque required to turn a given piece of equipment. This registering means is effective for either clockwise or counterclockwise operation of the tool, since the disc 54 merely has to be rotated 360 degrees so that the pointer is positioned on the opposite side of the member 56.

While we have shown and described herein the preferred form of our invention as applied to a tool in which a screwdriver bit is employed, it is to be understood that various types of implements may be inserted in the chuck and used for registering and measuring the torque of various types of rotatable bodies and that we are not limited to the precise details of construction shown and are only limited by the scope of the appended claims.

What is claimed is:

1. A torque measuring tool comprising a casing, an implement holding chuck rotatably mounted on one end thereof, an encircling band having a scale thereon rotatably mounted on said casing adjacent said chuck a hairline marking on said chuck registering with said scale, a helical spring positioned in said casing, a pair of supporting members encompassed by the ends of said spring, each of said supporting members having a relieved shoulder portion at its inner end means on said spring in engagement with said shoulder portions for securing said spring thereto, one of said members secured to said chuck and the other to said casing, whereby rotary movement applied to said casing will be imparted to said chuck through said spring.

2. A torque measuring tool comprising a casing, an implement holding chuck having an inwardly extending sleeve portion integral therewith rotatably mounted in one end thereof, a bushing mounted on said sleeve and having a slot therein, means for securing said bushing to said sleeve, means mounted on said casing and extending thereinto in engagement with said slot to limit the rotation of said bushing, an encircling band having a scale thereon rotatably mounted on said casing adjacent said chuck a hairline marking on said chuck registering with said scale, a helical spring positioned in said casing, a pair of supporting members encompassed by and secured to the ends of said spring, each of said supporting members having a relieved shoulder portion at its inner end, one of said members secured to said chuck and the other to said casing whereby rotary movement applied to said casing will be imparted to said chuck through said spring.

3. A torque measuring tool comprising a casing, a chuck having an inwardly extending sleeve integral therewith, rotatably mounted in one end of said casing, a shaft having a shoulder portion on each end thereof positioned in said sleeve, a bushing mounted on said sleeve and having a circumferential slot therein, means passing through said sleeve, bushing and shaft for securing them together, an implement in said chuck having a shoulder on its inner end, in engagement with the shoulder on the outer end of said shaft, means on said casing and extending into said circumferential slot to limit the rotation of said casing, a helical spring in said casing, a pair of supporting members encompassed by the ends of said spring, each of said supporting members having a relieved shoulder portion at its inner end, and means on said spring in engagement with said relieved shoulder portions for securing said spring thereto, one of said supporting members having a shoulder on its outer end in engagement with the shoulder on the inner end of said shaft and the other secured to said casing, whereby rotary movement applied to said casing will be imparted to said chuck and said implement positioned therein through said spring and said shaft.

ARTHUR C. MILLARD.
OTIS C. MORRILL.

REFERENCES CITED

The following references are of record in the file of this patent:

UNITED STATES PATENTS

| Number | Name | Date |
|---|---|---|
| 774,931 | Bucknam | Nov. 15, 1904 |
| 2,151,953 | Zimmerman | Mar. 28, 1939 |
| 2,256,478 | Hill | Sept. 23, 1941 |